United States Patent
Murakami et al.

(10) Patent No.: US 8,900,682 B2
(45) Date of Patent: Dec. 2, 2014

(54) DECORATIVE CAN BODY AND PROCESS FOR PRODUCING THE SAME

(75) Inventors: Shigenobu Murakami, Yokohama (JP); Zen Kanayama, Yokohama (JP); Atsushi Fukahori, Yokohama (JP)

(73) Assignee: Toyo Seikan Kaisha, Ltd., Tokyo (JP)

(*) Notice: Subject to any disclaimer, the term of this patent is extended or adjusted under 35 U.S.C. 154(b) by 817 days.

(21) Appl. No.: 13/057,181

(22) PCT Filed: Aug. 4, 2009

(86) PCT No.: PCT/JP2009/063828
§ 371 (c)(1), (2), (4) Date: Jun. 16, 2011

(87) PCT Pub. No.: WO2010/016503
PCT Pub. Date: Feb. 11, 2010

(65) Prior Publication Data
US 2011/0244158 A1   Oct. 6, 2011

(30) Foreign Application Priority Data
Aug. 4, 2008 (JP) .................................. 2008-200306

(51) Int. Cl.
*B29D 22/00* (2006.01)
*B29D 23/00* (2006.01)
(Continued)

(52) U.S. Cl.
CPC .............. *C08G 18/42* (2013.01); *C08G 18/798* (2013.01); *C09J 2467/00* (2013.01); *C09J*
(Continued)

(58) Field of Classification Search
USPC ........................................ 428/35.8; 156/182
See application file for complete search history.

(56) References Cited

U.S. PATENT DOCUMENTS

| 5,410,011 A | 4/1995 | Konishi et al. |
| 5,925,698 A | 7/1999 | Steckel |
| 2005/0222364 A1 | 10/2005 | Rawlins et al. |

FOREIGN PATENT DOCUMENTS

| JP | 6-172735 A | 6/1994 |
| JP | 6-278751 A | 10/1994 |

(Continued)

OTHER PUBLICATIONS

International Search Report of PCT/JP2009/063828, date of mailing date Sep. 15, 2009.

*Primary Examiner* — Michael C Miggins
(74) *Attorney, Agent, or Firm* — Westerman, Hattori, Daniels & Adrian, LLP

(57) ABSTRACT

The present invention is an invention made to provide decoration with excellent brilliant specular gloss on the outer surface of the barrel portion of the can body in a seamless can or the like heavily used as a storage container for food, drink or the like, to increase the commercial product value of the seamless can or the like. The present invention is a decorative can body having excellent specular gloss, having a metal foil or a vapor-deposited metal layer provided on the outer surface of a can barrel via an adhesive layer and having a printed film further laminated, wherein a thermosetting resin adhesive with an internally blocked curing agent that generates no by-product gas in heat curing is used for the adhesive layer.

12 Claims, 3 Drawing Sheets

(51) Int. Cl.
  *B32B 1/08* (2006.01)
  *B32B 15/08* (2006.01)
  *C08G 18/79* (2006.01)
  *C09J 7/02* (2006.01)
  *B32B 15/09* (2006.01)
  *C09J 167/00* (2006.01)
  *B32B 7/12* (2006.01)
  *C08G 18/42* (2006.01)
  *B32B 27/36* (2006.01)
  *C09J 175/06* (2006.01)
  *B65D 25/34* (2006.01)
  *B32B 27/08* (2006.01)

(52) U.S. Cl.
  CPC ...... *7/0203* (2013.01); *B32B 15/09* (2013.01); *B65D 2203/00* (2013.01); *C09J 167/00* (2013.01); *B32B 7/12* (2013.01); *B32B 2255/205* (2013.01); *B32B 2255/26* (2013.01); *B32B 2439/66* (2013.01); *B32B 2307/406* (2013.01); *C09J 2400/163* (2013.01); *B32B 2255/10* (2013.01); *B32B 15/08* (2013.01); *C09J 7/0296* (2013.01); *B32B 27/36* (2013.01); *C09J 175/06* (2013.01); *C09J 2475/00* (2013.01); *B65D 25/34* (2013.01); *B32B 27/08* (2013.01)
  USPC ........................................ 428/35.8; 156/182

(56) References Cited

FOREIGN PATENT DOCUMENTS

| | | |
|---|---|---|
| JP | 8-207195 A | 8/1996 |
| JP | 09-099677 A | 4/1997 |
| JP | 11-268746 A | 10/1999 |
| JP | 11-315226 A | 11/1999 |
| JP | 2000-095248 A | 4/2000 |
| JP | 2000-119561 A | 4/2000 |
| JP | 2002-231848 A | 8/2002 |
| JP | 2005-001676 A | 1/2005 |
| JP | 2005-206160 A | 8/2005 |
| JP | 2005-313502 A | 11/2005 |
| WO | 2005/095482 A1 | 10/2005 |

DECORATIVE CAN BODY AND PROCESS FOR PRODUCING THE SAME

TECHNICAL FIELD

The present invention relates to a decorative can body having excellent specular gloss and a process for producing the same, and specifically concerns a decorative can body having excellent specular gloss, using a particular adhesive for obtaining specular gloss, in providing a metal layer and a printed film layer on the surface of the can barrel of a seamless can or the like, and a process for producing the same.

BACKGROUND ART

Metal can bodies, such as steel cans and aluminum cans, have lighter weight and higher shock resistance, have better storage properties and sealing properties, and are also more easily recycled and reused than glass bottles. Therefore, they are heavily used and used for various purposes as containers for food or drink storage, particularly as containers for soft drinks, such as soda pop, luxury drinks, such as coffee, or alcoholic drinks, such as beer, as in plastic containers.

Characters and a design are printed on the surface of the barrel portion of these can body containers to indicate the packed contents of a commercial product, a trade name, and the like, and also increase consumers' willingness to purchase the product. In order to attract the attention of consumers and promote sales, a design and ornamentation, the so-called decoration, on the surface of the barrel portion of a commercial product can body are regarded as important. Recently, particularly, decoration in which the can body of a commercial product is conspicuous and which is aesthetic and has an impact (is impressive) to obtain a high grade feel and the favor of purchasers has become more important.

Therefore, previously, an ornamental pattern has been directly printed on the barrel portion of a can body, or a resin film on which a pattern is printed has been attached to the barrel portion of a can body. But, clear printing on a cylinder surface is difficult due to curved surface printing, and even if a printed film is simply wound and attached around a barrel portion, simple ornamentation without elegance is provided. In addition, in metal can bodies, generally, specular gloss is regarded as important as an aesthetic design, and in aluminum cans, the bright and brilliant metal color of the metal is used for a design effect as the background (base) of an ornamental pattern.

In seamless cans formed by drawing, drawing and ironing, or stretch-drawing an aluminum alloy plate or a steel plate, the side wall is subjected to severe processing, and therefore, surface roughness occurs, and the specular gloss is insufficient. In aluminum cans, the metal color is relatively excellent, but better specular properties may be desired. In addition, particularly for seamless cans formed from a resin-coated metal plate in which a polyester film or the like is laminated, in both aluminum cans and steel cans, the forming is such that the metal surface does not come into direct contact with the forming tool. Therefore, the surface roughness of the metal surface under the resin is larger, and specular gloss has not been obtained. In welded cans, specular gloss cans have been made by making the degree of surface roughness of a tin-plated steel plate very small, but a problem has been that such a surface is easily scratched due to conveyance during can production, and the like.

In steel cans that are more inexpensive than aluminum cans, specular gloss like that of aluminum cans is not obtained, and a dull grayish metal color is obtained. Therefore, attempts are made to exhibit specular gloss by applying a bright metal powder paint to the barrel portion of the can body, or attaching a resin film, on which gravure printing with metal-like gloss is provided by a silver ink, to the barrel portion of the can body. But, it is difficult to obtain sufficiently bright, brilliant specular gloss.

There is also a gravure ink containing vapor-deposited aluminum as a pigment. But, in a case where printing is performed with the gravure ink, even if a metallic feel appears, the aluminum pigment whitens when the can body is subjected to retort treatment, and therefore, the gloss decreases.

Accordingly, an attempt to exhibit a high-grade specular gloss feel by attaching a brilliant metal foil or vapor-deposited metal layer, such as aluminum, to the surface of the barrel portion of a metal can body, such as a steel can, is also proposed (Patent Document 1), but a deep high-grade specular gloss feel is not obtained.

Recently, can bodies in which a metal foil or a vapor-deposited metal layer and a transparent resin film on which a pattern is printed are combined and laminated on the barrel portion of a can body to provide decoration with a deep ornamental pattern and metal gloss have been disclosed (Patent Documents 2 to 4).

Such decorative can bodies are expected to provide high-grade decoration even in steel cans due to the correlation between a deep ornamental pattern and brilliant specular gloss. But, even in experimental production, many blisters (fine protrusions) occur in the ornamental surface, and thus, no specular gloss appears, and beautiful and brilliant specular gloss ornamentation is not obtained.

Patent Document 1: Japanese Patent Laid-Open No. 2000-229642 (see Abstract)
Patent Document 2: Japanese Patent Laid-Open No. 2000-95248 (see Abstract and FIG. 2 (C))
Patent Document 3: Japanese Patent Laid-Open No. 2005-1676 (see Abstract and FIG. 6)
Patent Document 4: Japanese Patent Laid-Open No. 2005-206160 (see Abstract)

DISCLOSURE OF THE INVENTION

Problems to be Solved by the Invention

As generally described in Background Art, in particularly seamless cans, especially their steel cans, among metal can bodies, specular gloss is not exhibited on the can body surface, and decoration is not provided even if a printed pattern is provided. Therefore, it is demanded and is necessary that the surface of the barrel portion of the can body should have brilliant specular gloss.

Can bodies in which a metal foil or a vapor-deposited metal layer and a transparent resin film on which a pattern is printed are combined and laminated on the barrel portion of a can body to provide decoration with a deep ornamental pattern and specular gloss are disclosed. Such decorative can bodies are expected to provide high-grade decoration even in seamless cans due to the correlation between a deep ornamental pattern and brilliant specular gloss. But, even in experimental production, many blisters occur in the ornamental surface to cause appearance defects, and thus, no specular gloss appears, and beautiful and brilliant specular gloss ornamentation is not obtained.

Accordingly, the present inventors determines that a problem to be solved by the invention is to provide decoration with excellent specular gloss on the surface of the barrel portion of the can body in a seamless can heavily used as a storage container for food, drink or the like, to increase the commercial product value of the seamless can.

Means for Solving the Problems

In order to solve the problem of the invention described above, the present inventors have considered causes for the fact that in can bodies in which an attempt is made to provide decoration with a deep ornamental pattern and specular gloss by combining a metal foil or a vapor-deposited metal layer and a transparent resin film on which a pattern is printed and laminating them on the barrel portion of a can body, it is expected to provide high-grade decoration due to the correlation between a deep ornamental pattern and brilliant specular gloss, but even in experimental production, many blisters occur in the ornamental surface to cause appearance defects, and thus, no specular gloss appears, and beautiful and brilliant specular gloss ornamentation is not obtained, which is described above. It has turned out that a thermosetting resin adhesive layer is generally present between the metal foil or the vapor-deposited metal layer and the barrel portion of the can body, but when the adhesive is cured, a by-product gas in the curing reaction is produced, and there is no escape for the gas, and therefore, many blisters due to gas pressure occur in the ornamental surface, and thus, no specular gloss appears, and beautiful and brilliant specular gloss ornamentation is not obtained.

A phenomenon in which blisters are caused by the generation of a by-product gas is disclosed in FIG. 1 as schematic cross-sectional views of a can body without a vapor-deposited metal layer (left figure) and a can body in which metal vapor deposition is provided on the printed surface of a resin film (right figure).

In such can bodies, thermosetting resin adhesives, such as polyurethane resin-based adhesives, polyester resin-based adhesives, polyester polyurethane resin-based adhesives, or epoxy resin-based adhesives, that have very good adhesiveness to metal materials and plastic materials and also have excellent various adhesion properties are used. But, in such adhesives, the generation of a gas due to the gasification of a by-product (low molecular compound) in the curing reaction of the adhesive is unavoidable. For example, in a polyurethane-based resin or the like, in a curing reaction during heating, a blocking agent that blocks the isocyanate group of the curing agent dissociates, and this sublimes into a gaseous body.

Then, the present inventors have searched for an adhesive that generates no by-product gas in a curing reaction, in such thermosetting resin adhesives, and found that when an internally blocked isocyanate curing agent is used, no by-product gas is generated in a curing reaction.

By using thermosetting resin adhesives, such as polyurethane-based resins and polyester resins, using an internally blocked isocyanate curing agent, for the adhesive between the metal layer and the barrel portion of the can body, it is completely prevented that when a metal foil or a vapor-deposited metal layer and a transparent resin film on which a pattern is printed are combined and laminated on the barrel portion of a can body, blisters occur in the ornamental surface to cause appearance defects, and thus, sufficient specular gloss appears, and beautiful and brilliant specular gloss ornamentation can be achieved in a seamless can for the first time, as a result, leading to the creation of the present invention.

Thus, in the present invention, the basic inventions are "a decorative can body having excellent specular gloss, having a metal foil or a vapor-deposited metal layer provided on a can barrel surface via an adhesive layer and having a printed film further laminated, wherein a thermosetting resin adhesive that generates no gas in heat curing is used for the adhesive layer," and "a process for producing a decorative can body having excellent specular gloss, comprising providing a metal foil or a vapor-deposited metal layer on a can barrel surface via an adhesive layer and further laminating a printed film, wherein the can barrel surface is mirror-finished without causing blisters (fine protrusions) in a decorative surface, by using, for the adhesive layer, a thermosetting resin adhesive that generates no gas in heat curing."

Further, in the present invention, the invention of a typical embodiment in the above basic inventions is a decorative can body in which the thermosetting resin adhesive that generates no gas is a thermosetting resin, particularly, a polyurethane resin-based adhesive, a polyester polyurethane-based resin adhesive, or a polyester resin-based adhesive, using an internally blocked isocyanate curing agent, the adhesive comprises an inorganic pigment, particularly titanium dioxide, the printed film is further surface-coated, a resin film is provided between the printed film and the vapor-deposited metal layer via a transparent adhesive layer, a hologram pattern (a stereoscopic feel pattern due to light interference) is provided between the printed film and the vapor-deposited metal layer, and further, a food or a drink is packed, and the decorative can body is retort-treated.

The requirements of the present invention are new particular configurations described above, and therefore, the present invention provides especial features (operation and effect) that (i) it is completely prevented that when a metal foil or a vapor-deposited metal layer and a transparent resin film on which a pattern is printed are combined and laminated on the barrel portion of a can body, blisters occur in the ornamental surface to cause appearance defects, and thus, sufficient specular gloss appears, and beautiful and brilliant specular gloss ornamentation can be achieved in a seamless can for the first time, (ii) even if the seamless can is subjected to retort treatment, the specular gloss does not degrade to cause whitening, and (iii) the adhesion and bonding of the layers of the laminate on the barrel portion of the can body are strong, and even if the can is subjected to retort treatment, no peeling occurs.

Such requirements for new special configurations and especial features cannot be guessed in the prior documents listed in Background Art as well as other patent documents.

The rationality and significance in the requirements for the special configurations, and the especial features in the present invention are demonstrated by the data of Examples and the contrast between Examples and Comparative Example described later, which is important in the present invention.

The present invention has been outlined above as means for solving the problem of the invention, according to circumstances in which the present invention is created, and the basic configurations and features of the present invention. Therefore, the entire invention of the present application will be surveyed here. The present invention is composed of the following group of invention units. Inventions [1] and [10] are the basic inventions, and other inventions embody the basic inventions or are embodiments of the basic inventions. The entire group of inventions is collectively referred to as "the present invention."

[1] A decorative can body having excellent specular gloss, having a metal foil or a vapor-deposited metal layer provided on a can barrel surface via an adhesive layer and having a printed film further laminated, wherein a thermosetting resin adhesive that generates no gas in heat curing is used for the adhesive layer.

[2] The decorative can body having excellent specular gloss according to [1], wherein the thermosetting resin adhesive that generates no gas is a thermosetting resin adhesive using an internally blocked isocyanate curing agent.

[3] The decorative can body having excellent specular gloss according to [2], wherein the thermosetting resin adhesive that generates no gas is any one or a mixture of two or more of a polyurethane resin-based adhesive, a polyester polyurethane resin-based adhesive, or a polyester resin-based adhesive using an internally blocked isocyanate curing agent.

[4] The decorative can body having excellent specular gloss according to any of [1] to [3], wherein the adhesive comprises an inorganic pigment.

[5] The decorative can body having excellent specular gloss according to any of [1] to [4], wherein an outer surface of the printed film is surface-coated.

[6] The decorative can body having excellent specular gloss according to any of [1] to [5], wherein a resin film is provided between the printed film and the metal foil or the vapor-deposited metal layer via a transparent adhesive layer.

[7] The decorative can body having excellent specular gloss according to any of [1] to [5], wherein a hologram pattern is provided between the printed film and the vapor-deposited metal layer.

[8] The decorative can body having excellent specular gloss according to any of [1] to [7], wherein food or drink is packed, and the decorative can body is retort-treated.

[9] The decorative can body having excellent specular gloss according to any of [1] to [8], wherein the can body is a resin-coated seamless can.

[10] A process for producing a decorative can body having excellent specular gloss, comprising providing a metal foil or a vapor-deposited metal layer on a can barrel surface via an adhesive layer and further laminating a printed film, wherein the can barrel surface is mirror-finished without causing blisters (fine protrusions) in a decorative surface, by using, for the adhesive layer, a thermosetting resin adhesive that generates no gas in heat curing.

[11] The process for producing a decorative can body having excellent specular gloss according to [10], wherein the adhesive that generates no gas is any one or a mixture of two or more of a polyurethane resin-based adhesive, a polyester polyurethane resin-based adhesive, or a polyester resin-based adhesive using an internally blocked isocyanate curing agent.

[12] The process for producing a decorative can body having excellent specular gloss according to [10] or [11], wherein a hologram pattern is provided between the printed film and the vapor-deposited metal layer.

Advantages of the Invention

The present invention provides especial effects that (i) it is completely prevented that when a metal foil or a vapor-deposited metal layer and a transparent resin film on which a pattern is printed are combined and laminated on the barrel portion of a can body, blisters occur in the ornamental surface to cause appearance defects, and thus, sufficient specular gloss appears, and beautiful and brilliant specular gloss ornamentation can be achieved in a seamless can or the like for the first time, (ii) even if the seamless can is subjected to retort treatment, the specular gloss does not degrade to cause whitening, and (iii) the adhesion and bonding of the layers of the laminate on the barrel portion of the can body are strong even if the can is subjected to retort treatment.

BEST MODE FOR CARRYING OUT THE INVENTION

Figure 1:
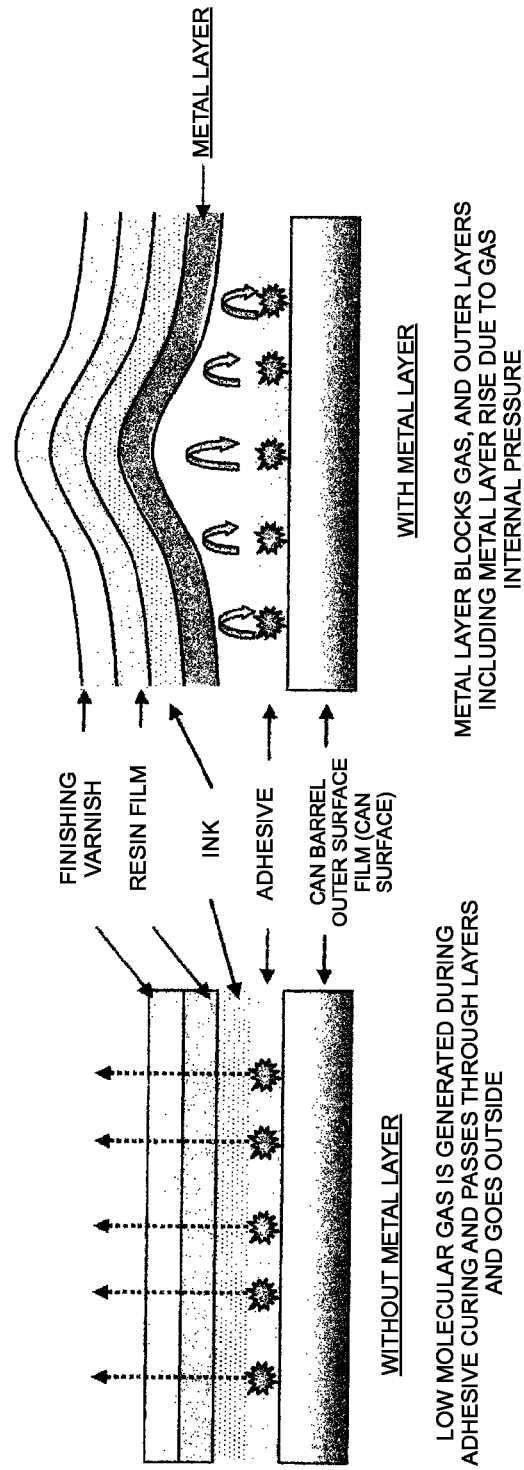
FIG. 1 is schematic cross-sectional views showing a phenomenon in which blisters are caused by the generation of a by-product gas.

The present invention has been described above according to circumstances leading to the creation of the present invention, means for solving the problem of the present invention, and the basic configurations and features of the present invention. But, embodiments for the inventions of the present invention group described above will be specifically described below in detail, with reference to the drawings.

1. Regarding Decorative can Body Having Excellent Specular Gloss According to Present Invention (1) Basic Configuration The basic configuration of the decorative can body of the present invention is a decorative can body having excellent specular gloss, having a metal foil or a vapor-deposited metal layer provided on a can barrel surface via an adhesive layer and having a printed film further laminated, wherein a thermosetting resin adhesive that generates no gas in heat curing is used for the adhesive layer.

Specular gloss refers to a beautiful, brilliant metallic decorative design, like specular reflected light, and contrasts with matte decoration having no gloss.

For specular gloss, to be exact, there is a measurement method provided in "JIS Z 8741 (Specular Glossiness Measurement Method)" (see Japanese Patent Laid-Open No. 8-3781 at [0008]), but in the present invention, specular gloss is a visual sensation design pattern, and therefore is evaluated in vision.

For the can body, seamless cans essentially exhibit no brilliant specular gloss because of severe forming processing, and therefore, the object and operation and advantages of the present invention are most manifested in the decoration of seamless can bodies, particularly their steel cans. Particularly in the case of resin-coated seamless can bodies, the unevenness of the metal surface due to forming is large, and therefore, the operation and effect are significant. Aluminum (sometimes abbreviated as "alumi" in the description of the present application) is most preferred as the metal foil or the vapor-deposited metal layer because of its inherent bright brilliant metal color and specular glossiness.

In addition, the present invention can also be applied to welded cans as other can bodies. A welded can is made by printing the outer surface of a metal plate sheet, such as LTS (low tin steel, low tin-plated steel plate), TNS (tin-nickel-plated steel plate), or a tin plate, coating the inner surface, then cutting the metal plate sheet into a blank, forming the blank into a cylindrical shape, and then welding the side seam. The operation and advantages of the present invention are obtained by laminating a resin film, on which a metal is vapor-deposited, on the outer surface of the metal plate sheet via an adhesive. With these specifications, a specular gloss can body can be obtained without making the degree of roughness of the metal plate extremely small, and therefore, the production yield is good.

(2) Specific Example of Decorative can Body of Present Invention

A typical specific example of the decorative can body of the present invention is a decorative can body having excellent specular gloss and ornamentation, obtained by providing an aluminum metal foil or a vapor-deposited aluminum metal layer on a white polyester resin film attached to the surface of the can barrel of a resin-coated seamless steel can, via a polyester-based resin adhesive layer with an internally blocked isocyanate curing agent, further providing a polyester-based resin film or an anchor coating as required, further laminating a printed film, on which a trade name and an ornamental pattern are printed, via a transparent adhesive layer as required, and providing a surface coating (finishing varnish) on the printed film.

Figure 2:
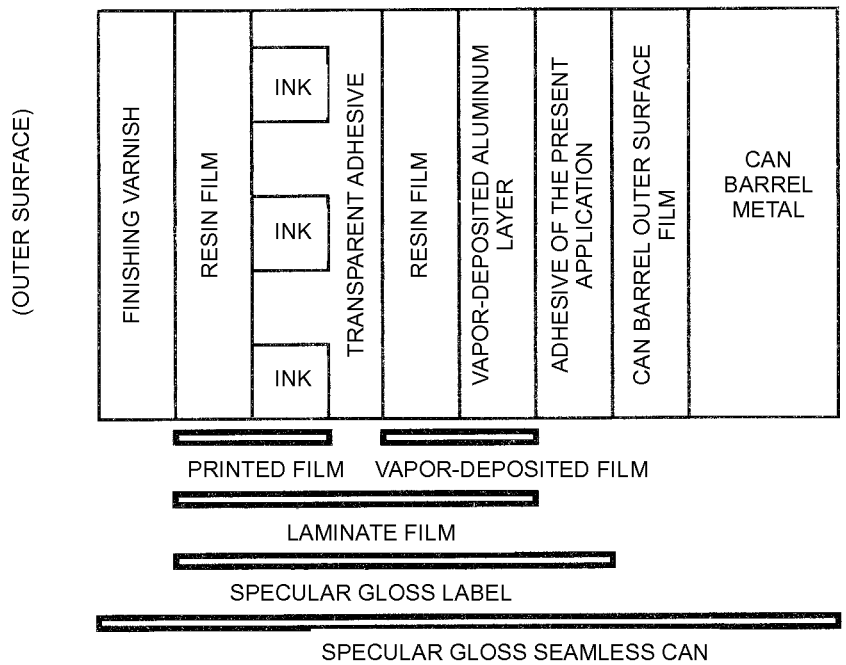
FIG. 2 is a schematic cross-sectional view showing the laminated structure of a decorative portion on the outer surface of the barrel portion of a seamless can body made of steel in the present invention.

The laminated structure of a decorative portion on the surface of the barrel portion of a resin-coated seamless steel can body, as a typical example of the decorative can body of the present invention, is illustrated in FIG. 2 as a schematic diagram, and the layer configuration of the above specific example is shown.

2. Regarding Layers of Laminated Structure of Decorative Portion (1) Can Barrel Outer Surface Film The can barrel outer surface film is provided on a resin-coated seamless can body, and has the effect of decreasing the waste solvent and decreasing the amount of water used, during container production. Generally, a polyester resin film containing a white pigment, such as titanium oxide, is used in a steel can, and a transparent polyester resin film is used in an alumi can. The can barrel outer surface film is not necessary in the case of a seamless can body formed from a metal plate that is not previously resin-coated, and in the case of a welded can.

(2) Adhesive

The adhesive is an adhesive for bonding the metal foil or the vapor-deposited metal layer (preferably previously formed as a layer on a resin film surface or a printed film surface, and sometimes referred to as a "metal layer" as "a generic name including a metal foil or a vapor-deposited metal layer" below) to the surface of the barrel portion of the can body, preferably via the can barrel outer surface film. There is also a mode of the adhesive that bonds the resin film surface of the film, on which the metal layer is provided, to the can barrel metal or the can barrel outer surface film, or the like.

Specific examples of the adhesive include thermosetting adhesives that easily bond to the can barrel outer surface film and the metal layer by heating and pressurization and have good bonding properties, and thermosetting adhesives, such as polyurethane-based, polyester-based, polyester polyurethane-based, and epoxy-based thermosetting adhesives, are preferably used. In addition, it is also possible to use thermoplastic resins, such as polyester-based resins, ethylene vinyl acetate copolymers (EVA), and ethylene methacrylate copolymers (EMMA). In the case of thermoplastic resins, the melting point is preferably equal to or higher than retort treatment temperature. In terms of retort resistance, thermosetting adhesives are more preferred.

The thermosetting adhesives, such as polyurethane-based, polyester-based, and polyester polyurethane-based thermosetting adhesives, mainly used in the present invention are those used as adhesives for various purposes in technical fields.

The polyurethane-based adhesives comprise a urethane prepolymer of a polyisocyanate and a polyol as the main agent. The polyester-based adhesives comprise, as the main agent, a thermosetting polyester resin that is a polyester resin having an unsaturated bond and is obtained by bonding an acid component comprising an unsaturated acid at least in part and an alcohol. The polyester polyurethane resin-based adhesives comprise, as the main agent, a resin produced by further subjecting a polyester polyol produced by the condensation polymerization reaction of a polyol and a polycarboxylic acid to a urethane reaction with a polyisocyanate. All are cured by curing agents, such as isocyanate curing agents and melamine resins.

An internally blocked type isocyanate curing agent is used as the thermosetting component (curing agent) used in the adhesive. An isocyanate having a uretdione group, or an isocyanate having a uretimine group is illustrated as the curing agent.

The solvent used in the adhesive is not particularly limited, but includes ester-based solvents, such as ethyl acetate and butyl acetate, ketone-based solvents, such as acetone, methyl ethyl ketone, methyl isobutyl ketone, and cyclohexanone, and aromatic hydrocarbons, such as toluene and xylene, which are usually used in paints or adhesives.

The adhesive layer generally preferably has a thickness of 1 to 6 μm, further, more preferably 2 to 5 μm. In addition, the adhesive layer may be previously provided on the can barrel surface, or may be previously provided on the can barrel outer surface film.

In the present invention, as described above, thermosetting resin adhesives, such as polyurethane-based adhesives, polyester-based adhesives, polyester polyurethane-based adhesives, or epoxy resin-based adhesives, that have very good adhesiveness to metal materials and plastic materials and also have excellent various adhesion properties are preferably used. But, as described above, in such adhesives, the generation of a gas due to the gasification of a by-product (low molecular compound) in the curing reaction of the adhesive has been heretofore unavoidable. For example, in a polyurethane-based resin, in a curing reaction during heating, a blocking agent that blocks the isocyanate group of the curing agent dissociates, and this sublimes into a gaseous body. This gaseous body is present between the barrel portion of the can body and the metal layer, and therefore, there is no escape for the gas. Therefore, many blisters due to gas pressure occur in the ornamental surface, and thus, no specular gloss appears, and beautiful and brilliant specular gloss ornamentation is not obtained.

The blocking agent is a low molecular compound, such as an oxime, a lactam, an ester, a ketone, or an amide, as is well known.

Therefore, in the present invention, the use of an adhesive that generates no by-product gas in a curing reaction is an essential requirement in such thermosetting resin adhesives, and specifically, an internally blocked isocyanate curing agent in which the isocyanate group of the curing agent is internally blocked is used. The reaction in a case where an isocyanate having a uretdione group is used as an internally blocked isocyanate, and the reaction in a case where an isocyanate having a uretimine group is used as an internally blocked isocyanate are shown in the following formulas respectively.

[Formula 1]

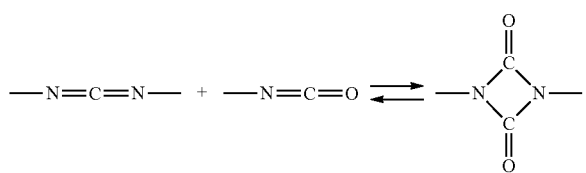

[Formula 2]

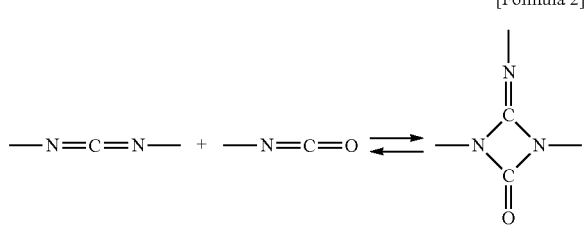

Thus, it is completely prevented that when a metal foil or a vapor-deposited metal layer and a transparent film on which a pattern is printed are combined and laminated on the barrel portion of a can body, blisters occur in the ornamental surface to cause appearance defects, and thus, specular gloss appears, and beautiful and brilliant specular gloss ornamentation can be achieved.

The amount of the internally blocked isocyanate curing agent mixed is preferably 0.1 parts by weight to 20 parts by weight with respect to 100 parts by weight of the main agent resin because if the amount is more than the upper limit, the excess isocyanate remains, and a decrease in adhesiveness tends to occur, and if the amount is less than the lower limit, a decrease in adhesiveness tends to occur, due to a shortage of the curing agent.

Other curable adhesives, such as alkyd resins and phenolic resins, also produce low molecular gases, such as alcohols and formaldehyde, as by-products in a curing reaction. In addition, thermoplastic resin adhesives also generate no by-product gas, and therefore can be used. However, thermoplastic resins generally have lower adhesion to metals and plastics than thermosetting resins, and therefore, thermosetting resin adhesives are more preferred. In addition, in the case of a can body for contents requiring retort treatment, it is necessary that the melting point of a thermoplastic resin be a melting point equal to or higher than the retort treatment temperature.

As one of the secondary features of the present invention, the specular glossiness is further improved by the fact that the adhesive layer comprises an inorganic pigment (particularly titanium oxide).

It cannot be said that the mechanism of the improvement in specular glossiness due to the fact that the adhesive layer comprises an inorganic pigment can be sufficiently clarified, but the mechanism is considered as follows.

The vapor-deposited metal layer is vapor-deposited on a resin film (biaxially oriented film). Heat at 170 to 210° C. is applied to the resin film during the baking of the adhesive layer in an oven, and the thermal shrinkage of the resin film occurs. With this, a phenomenon in which cracks occur in the vapor-deposited metal layer, and the specular gloss decreases may occur. It is presumed that at this time, when an inorganic pigment is contained in the adhesive between the resin film and the can body, the thermal shrinkage of the resin film is suppressed, and therefore, cracks do not occur easily in the vapor-deposited metal layer.

The amount of the inorganic pigment mixed in adhesive layer is preferably 1 part by weight to 100 parts by weight with respect to 100 parts by weight of the main agent resin. If the amount is more than the upper limit, the pigment is too much, and insufficient adhesiveness is easily caused. If the amount is less than the lower limit, the pigment is too little, and the effect of preventing cracks may be insufficient.

(3) Metal Foil or Vapor-Deposited Metal Layer

In the present invention, examples of the metal foil include, in addition to alumi foil, those obtained by forming a simple substance or an alloy of copper, silver, zinc, nickel, or the like with ductility into a thin film.

For the thickness of the metal foil, about 3 to 20 μm is used, and the thickness is preferably 5 to 10 μm. The metal foil is laminated on the can barrel outer surface film or the printed film via a transparent adhesion layer. The metal foil having a thickness of less than 3 μm is difficult to be handled. If the thickness is more than 20 μm, an increase in cost is caused, which is not preferred.

For the vapor-deposited metal layer, the resin film that is a substrate on which a metal is to be vapor-deposited is preferably transparent. It is preferred to provide the vapor-deposited metal layer on the can body side of the resin film because a configuration in which the transparent resin film is sandwiched between the printed film and the vapor-deposited metal layer is provided, and light rays reflected by the vapor-deposited metal layer, and the printed image surface achieve a stereoscopic decoration effect. In addition, it is also possible to provide the vapor-deposited metal layer on the outer surface side of the resin film. Further, it is also possible to provide the vapor-deposited metal layer on the printed surface side of the printed film via an anchor coating layer, and to provide the vapor-deposited metal layer on the side opposite to the printed surface of printed film and dispose the vapor-deposited metal film on the can body side.

For the resin film on which the vapor-deposited metal layer is to be provided, a thickness of 5 to 30 μm is preferred, and further, about 10 to 20 μm is more preferred. As the resin film, thermoplastic resin films having relatively high transparency and excellent heat resistance, such as a polyester film, a nylon film, and a polypropylene film, are used. As the resin film, an unoriented film and a uniaxially oriented film are also used, but it is more preferred to use a biaxially oriented film. In addition, the resin film having the same thermal properties and mechanical properties as the printed film is preferred, and the film thicknesses of both films are also preferably almost the same.

The vapor-deposited layer is laminated on one surface of the resin film that is a substrate. Examples of the metal used for the vapor-deposited layer include aluminum, copper, chromium, and silver. Among them, aluminum is most preferably used in terms of the decoration effect of having a silver-toned metal color and having excellent specular gloss, and cost and versatility.

As an illustration, aluminum vapor deposition is a layer obtained by vapor-depositing aluminum by an ordinary process, such as a vacuum deposition process, and specular gloss, together with a silver-toned metal color, can be obtained by the aluminum. For the thickness of the vapor-deposited layer, the vapor-deposited layer is preferably vapor-deposited with a thickness in the range of 200 to 800 Å, and further, more preferably 300 to 600 Å. With a thickness of less than 200 Å, sufficient specular gloss cannot be obtained, and the hiding power is also poor. If the thickness is more than 800 Å, sufficient specular gloss can be obtained, but the vapor deposition treatment takes time, and therefore, there is a fear that the productivity decreases.

By changing the type of the metal layer, regardless of the type of the metal material of the barrel portion of the can body, the metal layer can be decorated with specular gloss, together with metal colors with different color tones, such as a silver color for the use of aluminum, a bronze color for the use of copper, a gold color for the use of brass, and a dark silver color for the use of chromium nickel.

By laminating such a metal layer, a vivid metallic feel with high brilliantness is exhibited due to reflection by the metal. In addition, the effect of the reflected light of specular gloss by the metal layer closer to the can body side than the printed layer is received, and therefore, the decoration effect of an ornamental pattern using a specular gloss color with high brilliantness, in which the color and pattern of the printed layer, and the specular gloss of the metal layer are combined, can be obtained. In other words, when light transmitted through the transparent resin film enters the can body through a portion where the printed layer is not formed (and the printed layer when the printed layer transmits light), is transmitted through the transparent adhesion layer, reflected by the metal layer, transmitted through the transparent resin film again, and appears, the metallic reflected light of the metal layer and the printed pattern of the printed layer seem to overlap, and a deep stereoscopic feel, and a feel of an embossed pattern with specular gloss as the background color are created. Thus, a strong impression can be given to a person seeing the pattern, letters, and the like indicated on the printed layer.

When the vapor-deposited metal layer (aluminum) or the metal foil (aluminum foil) is exposed to a steam atmosphere at 100° C. or higher in retort treatment, the metal aluminum changes to a hydroxide or an oxide due to high temperature and high humidity, and therefore, the specular glossiness of the metal aluminum may decrease.

As a measure against this, it is effective to provide a surface coating layer (finishing varnish) on the outermost surface of the can body in order to decrease the amount of steam and oxygen passed to the metal aluminum surface, which is one of the secondary features of the present invention. In addition, by separately making the printed film and the vapor-deposited metal film and laminating them, the polyester resin layer can be made thick, and it is also possible to improve both the specular glossiness and the retort resistance.

(4) Printed Film

Thermoplastic resin films having relatively high transparency and excellent heat resistance, such as a polyester film, a nylon film, and a polypropylene film, with a thickness of 5 to 30 μm, preferably about 10 to 20 μm, are used as the resin film that is a substrate for the printed film (decorative film) covering the can body of the present invention.

The resin film used for the printed layer is preferably a transparent resin film in order to make the best use of specular reflected light from the metal layer provided closer to the can body side. In addition, it is also possible to obtain a special decoration effect by providing coloration in which transparency is maintained. In addition, the printed surface of the printed film may be provided on the can body side of the resin film, or may be provided on the side opposite to the can body, but is preferably provided on the can body side of the resin film so that the retort resistance is better.

As the resin film, an unoriented film and a uniaxially oriented film can also be used, but a biaxially oriented film is preferred because of excellent strength.

The adhesive that bonds the printed film and the metal layer is not particularly limited, and an ordinary transparent adhesive is appropriately used.

As the polyester film, those comprising ethylene terephthalate, ethylene butylate, and ethylene isophthalate as a main constituent are preferably used.

It is also possible to copolymerize other components. Examples of a dicarboxylic acid component to be copolymerized include aromatic dicarboxylic acids, such as naphthalenedicarboxylic acid, diphenyldicarboxylic acid, diphenylsulfonedicarboxylic acid, diphenoxyethanedicarboxylic acid, isophthalic acid, and phthalic acid, and aliphatic dicarboxylic acids, such as oxalic acid, succinic acid, adipic acid, sebacic acid, maleic acid, and fumaric acid, and further, alicyclic dicarboxylic acids, such as cyclohexanedicarboxylic acid.

Examples of a glycol component to be copolymerized include aliphatic glycols, such as propanediol, butanediol, pentanediol, and neopentyl glycol, and alicyclic glycols, such as cyclohexanedimethanol, and further polyoxyethylene glycols, such as diethylene glycol and polyethylene glycol.

For the above dicarboxylic acid component and glycol component, it is also possible to use two or more in combination.

When a nylon film is used as the thermoplastic resin film, polycondensates of diamines and dicarboxylic acids, such as nylon 66, nylon 610, and nylon 612, and ring-opening polymers of lactams, such as nylon 6, nylon 11, and nylon 12, can also be used.

The production of such a resin film can be performed by an ordinary process, and the resin film can be produced by forming into a film by a T-die process or an inflation film production process, and performing orienting treatment, such as uniaxial orienting or biaxial orienting, as desired.

It is also possible to provide an anchor coating layer for publicly known adhesiveness improving surface treatment, such as corona treatment, plasma treatment, and flame treatment, for the resin film, and for an improvement in the adhesiveness of the polyurethane resin, the modified polyester resin system, and the like. In addition, compounding agents for a film, for example, anti-blocking agents, such as amorphous silica, various antistatic agents, lubricants, antioxidants, and ultraviolet absorbers, can be mixed in the resin film according to a publicly known formula.

(5) Printed Layer

The printed layer is formed by printing a trade name and an ornamental pattern on one surface of the resin film, using a printing roller or using appropriate printing means, such as a gravure process, with a printing ink of a single color or printing inks of a plurality of colors (for example, 2 to 10 colors), and sequentially repeating printing in the case of a plurality of colors.

For the printing ink, an ink of a thermosetting urethane-based resin is preferably used. As the printing process, in addition to the above gravure printing, various printing processes, such as flexographic printing and offset printing, can be appropriately selected. It is preferred to form the printed layer by gravure printing in order to print beautiful letters and a beautiful pattern with abundant color tones, using abundant colors.

(6) Surface Coating Layer (Finishing Varnish)

After the covering with the printed film, it is preferred to apply a transparent thermosetting resin containing a lubricant as a surface coating (finishing varnish) layer in order to provide lubricity to the film surface or for the protection of the decorative layers.

As the transparent thermosetting resin, one obtained by adding an amino resin such as a melamine resin, a phenolic resin, or the like as a curing agent to a polyester resin, an acrylic resin, an epoxy resin, or the like as a basis, and further mixing 0.1 to 3% by weight of a lubricant, such as paraffin, polyethylene, or silicon, is used.

The thickness of the surface coating layer is about 0.1 to 10 μm, preferably about 0.5 to 5 μm.

The can body on which the surface coating layer is formed is baked. Baking is treatment performed to cure the adhesive for complete adhesion to the can body, and to remove the solvent contained in the surface coating layer and dry and cure the surface coating layer, and the can body is generally heated at 170 to 230° C. for about 0.5 to 2 minutes.

(7) Hologram Pattern

In the present invention, it is also possible to provide a hologram pattern between the printed film and the vapor-deposited metal layer.

The hologram pattern is known as a decorative pattern that stereoscopically (fine unevenness) shows a striped pattern due to the interference of light. The hologram pattern can synergistically decorate, with a more elegant stereoscopic ornamentation effect, a specular gloss label having a beautiful and brilliant design due to metal gloss and a printed pattern, on the decorative can body having excellent specular gloss according to the present invention.

Figure 3:
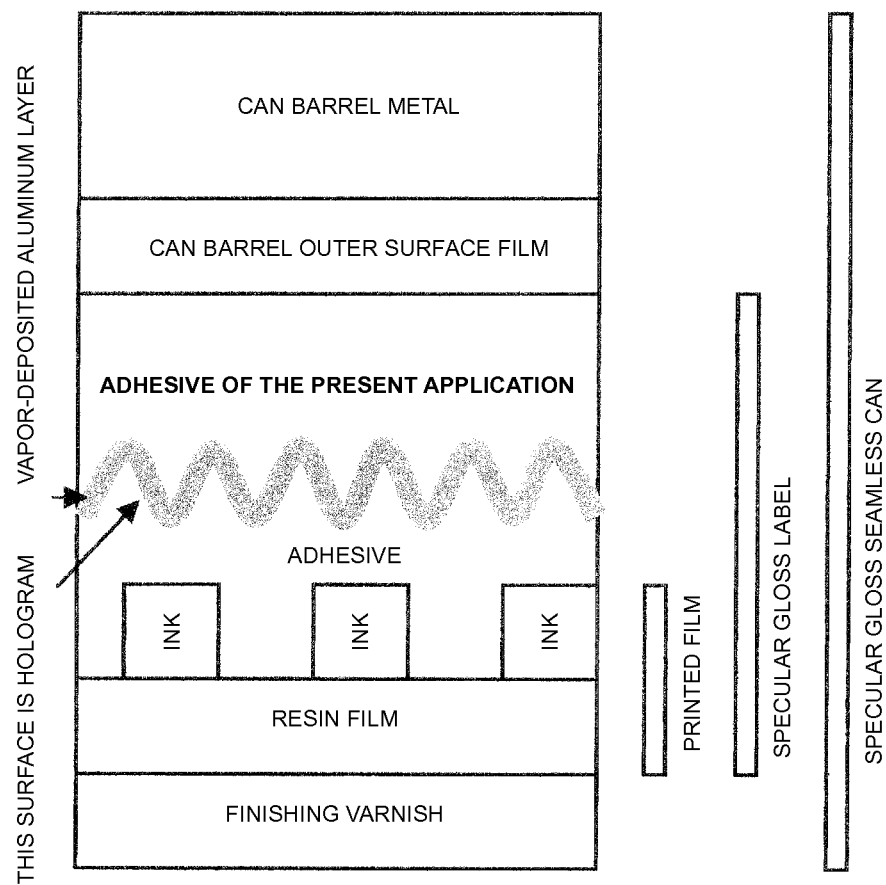
FIG. 3 is a schematic cross-sectional view showing the laminated structure of a decorative portion on the outer surface of the barrel portion of a can body, provided with a hologram pattern, in the present invention.

The laminated structure of the decorative portion on the outer surface of the barrel portion of the can body, provided with the hologram pattern, is illustrated in FIG. 3 as a schematic cross-sectional view.

As the process for producing the above specular gloss label with a hologram, the following process is illustrated. (i) A two-component curable resin material (adhesive), such as a polyester-based one or a urethane-based one, is applied to the printed surface of a printed film by an application roll. (ii) Then, the hologram pattern surface of the matrix of a film (oriented polypropylene film (OPP film) or the like) provided with a hologram pattern is contacted with the two-component curable resin material surface, and the matrix film and the two-component curable resin material are pressed and overlapped, and heated as required. (iii) After the overlapping, the cured two-component curable resin material and the matrix film are peeled. Thus, the hologram pattern can be formed on the surface of the adhesive layer on the ink surface side of the printed film. Further, (iv) when a metal (aluminum or the like) is vapor-deposited on the hologram pattern surface to form a vapor-deposited layer conforming to the unevenness of the hologram pattern, it is also possible to form the hologram pattern and the vapor-deposited metal layer at one time. At the time, (v) then, the adhesive of the present application is applied to the vapor-deposited aluminum layer surface to fabricate a specular gloss label.

In order to produce the above matrix film, first, a mold used for forming a matrix made of a resin film is formed by a publicly known process, that is, for example, a mold in which a fine uneven hologram pattern is precisely transferred onto nickel is formed by exposing a laser interference film to form an uneven resist pattern according to the density of the interference fringes on a dry plate on which a photoresist is applied, then, vapor-depositing a metal on the pattern surface to form a thin film to provide electrical conductivity, plating the thin film with nickel, and finally peeling this plated layer.

When this mold is pressed against a surface of a matrix material, such as an OPP film, with heating (heat pressure forming), the fine uneven hologram pattern formed on the mold is transferred to the surface of the matrix material made of the resin film as a hologram pattern, and a matrix of a film for hologram transfer is produced.

(8) Can Body Material

For the can body, seamless cans essentially exhibit no brilliant specular gloss, and therefore, the operation and effect of the present invention are most manifested in the decoration of seamless cans. In addition, among seamless cans, particularly steel cans exhibit no brilliant metal color, and therefore, the operation and effect of the present invention are easily manifested.

Various surface-treated steel plates, and light metal plates, such as aluminum, or resin-coated metal plates obtained by laminating a resin film on a surface of these steel plates and metal plates can be used as the material of the can body.

A chromic acid-treated steel plate, such as TFS (tin free steel), an aluminum-plated steel plate, a zinc-plated steel plate, a tin-plated steel plate, a nickel-plated steel plate, and the like can be used as the surface-treated steel plate. Those subjected to surface treatment, such as phosphate treatment or chromate treatment, can be used as required.

An aluminum plate and an aluminum alloy plate can be used as the light metal plate, and further, they may be surface-treated with a chemical conversion coating comprising an oxide of zirconium or titanium as a main component, a polyacrylic acid-zirconium salt composite coating, or the like.

The resin-coated metal plate is obtained by laminating a resin film on a surface of an aluminum alloy-based substrate or a steel-based substrate. The surface to be laminated may be the inner surface side, outer surface side, or both surfaces of the can body. As the resin to be laminated, thermoplastic films having relatively high transparency and excellent processability and heat resistance, such as a polyester film, a nylon film, and a polypropylene film, are used. For the lamination process, the resin-coated metal plate is made by a general process, such as direct coating from a T-die, a process for once forming an unoriented film from a T-die and then thermally laminating the film, or a process for thermally laminating a biaxially oriented film.

3. Regarding Process for Producing Decorative can Body Having Excellent Specular Gloss According to Present Invention (1) Basic Process A process for producing a decorative can body having excellent specular gloss according to the present invention is basically, a process for producing a decorative can body, comprising providing a metal foil or a vapor-deposited metal layer on a can barrel surface via a thermosetting resin adhesive layer and further laminating a printed film, wherein the can barrel surface is mirror-finished without causing blisters (fine protrusions) in a decorative surface, by using, for the adhesive layer, a thermosetting resin adhesive that generates no gas in heat curing.

For the adhesive that generates no gas, a polyurethane resin-based adhesive, a polyester polyurethane resin-based adhesive, or a polyester resin-based adhesive, or an epoxy resin-based adhesive using an internally blocked isocyanate curing agent is preferred.

(2) Production of Specular Gloss Label

An adhesion film comprising a printed resin film and a metal layer to be provided on a seamless can barrel is referred to as a specular gloss label here.

A process for providing a printed layer on one surface side of a resin film, a process for laminating a metal foil on a printed film, a process for laminating a vapor-deposited metal layer on a printed film, and a process for laminating a vapor-deposited metal layer on a resin film and then further laminating with a printed film are typical. Therefore, they will be described.

First, using, as a substrate, a long resin film that is separately prepared as a product in a previously coiled state, a printed layer is formed on one surface of this long resin film by a printing process, such as gravure printing, while the film is unwound and run (printed film).

Next, an adhesive is applied to the surface of the printed layer of the printed film, and a metal foil is further laminated on the adhesive. Alternatively, after an anchor coating is applied to the surface of the printed layer of the printed film, a metal is vapor-deposited by an ordinary process, such as a vacuum deposition process.

Further, apart from the above printed film to which the adhesive is applied, a vapor-deposited film in which a metal is vapor-deposited on a resin film by an ordinary process, such as a vacuum deposition process, is fabricated, and the adhesive side of the printed film and the resin side of the vapor-deposited film are laminated to fabricate a laminate film. In addition, at this time, the adhesive side of the printed film and the vapor-deposited layer side of the vapor-deposited film may be laminated to make a laminate film.

An adhesive is provided, using a coater, on the can body side of the resin film on which the metal layer is provided, fabricated in the above, to make a specular gloss label.

For the long specular gloss label produced as described above, one long specular gloss label (a size corresponding to one can body) may be formed across the width direction of the long film, or a plurality of long specular gloss labels (a size corresponding to a plurality of can bodies) may be provided.

(3) Production of Specular Gloss Seamless Can

The long specular gloss label obtained as described above is cut into such dimensions that its width is slightly longer than the perimeter of a can barrel to fabricate a label having the size of one can. Then, the can barrel of a seamless can is heated, and the above label is wound around the seamless can barrel to cover the outer peripheral surface of the can barrel. At this time, both ends of the label are overlapped and laminated to form an overlap portion, and pressed by a roll.

As conditions for covering the can barrel with the specular gloss label at the time, the speed is 10 to 300 m/min, the can barrel temperature is 140° C. to 200° C., and the pressure of the pressure roll is 250 to 750 N/cm as linear pressure. As preferred conditions, for the speed, 150 m/min or more is effective because the productivity is increased; for the can barrel temperature during the bonding, 150 to 190° C. is preferred in terms of protecting the printed layer, though also depending on the thermosetting temperature and melt viscosity of the adhesive; and for the pressure, higher pressure is effective for adhesiveness, but considering the stability of dimension, about 500 N/cm is preferred.

A surface coating layer is applied to the surface of the seamless can body covered with the specular gloss label as described above, and then, the surface coating layer and the adhesive are baked and cured in a baking oven. Then, neck-in processing and flange processing are performed near the opening of the can barrel by a neck-in processing machine and a flanging apparatus respectively, and a specular gloss seamless can is completed. In addition, for the surface coating layer on the surface, it is possible to fabricate the specular gloss label by applying the surface coating layer to the outer surface side of the printed film or the laminate film, baking the surface coating layer, and then applying the adhesive to the can barrel side, and then cover the seamless can barrel by the above process, rather than applying the surface coating layer after covering the seamless can barrel.

4. Regarding Uses for Decorative Can Body Having Excellent Specular Gloss According to Present Invention For uses for the decorative can body of the present invention, the decorative can body of the present invention is most suitable for storage containers for food or drink, but can also be used for medicines, cosmetics, aerosol products, and other uses. The decorative can body of the present invention is also preferably used for the storage of food or drink to be retort-treated.

Uses for soft drinks, such as natural mineral water and soda pop, luxury drinks, such as coffee and tea, alcoholic drinks, such as low-malt beer and beer, or the like are typical.

EXAMPLES

The present invention will be more specifically shown below as examples, by Examples, contrasted with Comparative Examples, with reference to the drawings, to demonstrate the rationality and significance of the requirements for the configurations of the present invention, and superiority to conventional art.

Examples According to Drawings

In the first basic invention of the present application (described above as [1]), the laminated structure of a decorative portion on the surface of the barrel portion of a seamless can body, as a typical example of the decorative can body of the present invention, is illustrated in FIG. 2 as a schematic diagram.

The layer configuration of the specific example in FIG. 2 is the laminated structure of a decorative can body obtained by laminating a specular gloss label, in which a transparent resin film on which a vapor-deposited aluminum metal layer is provided and a printed film on which a trade name and an ornamental pattern are printed are laminated, on a white polyester resin film on the outer surface of the can barrel of a seamless can, via a polyester-based resin adhesive layer with an internally blocked isocyanate curing agent, and then providing a surface coating layer (finishing varnish layer).

The layer configuration of the specific example in FIG. 3 is the laminated structure of a decorative can body in which a hologram pattern is provided between the printed film and the vapor-deposited metal layer to synergistically decorate, with a more elegant stereoscopic ornamentation effect, a specular gloss label having a beautiful and brilliant design due to metal gloss and a printed pattern.

[Fabrication of Seamless Can]

A 20 μm thick biaxially oriented polyethylene terephthalate/isophthalate copolymer film, and a 15 μm thick biaxially oriented polyethylene terephthalate/isophthalate copolymer film containing 20% by weight of titanium oxide were simultaneously thermally adhered to the can inner surface side and can outer surface side of a tin free steel plate (the amount of metal chromium: 120 mg/m$^2$, the amount of chromium oxide: 15 mg/m$^2$ as a surface treatment coating amount) with raw plate thickness: 0.24 mm and temper: T3-CA, respectively, at the melting point of the films, and immediately water-cooled to obtain a resin-coated metal plate.

A glamour wax was uniformly applied to this resin-coated metal plate, and then, a disk having a diameter of 143 mm was punched out of the resin-coated metal plate, drawn, and then stretch-drawn to obtain a thin-walled deep-drawn cup having a diameter of 52 mm and a height of 112 mm.

Then, doming forming was performed according to an ordinary process, and then, the above thin-walled deep-drawn cup was heat-treated at 215° C. for 1 minute to remove the processing strain of the film and volatilize the lubricant. Then, the opening end was subjected to edge cutting to obtain a seamless cup having a height of 106 mm.

[Fabrication of Specular Gloss Label]

One surface of a transparent biaxially oriented polyethylene terephthalate film (PET film) having a thickness of 12 μm was subjected to corona treatment according to an ordinary process, and a printing ink layer having a thickness of 2 μm was provided on the corona-treated side by gravure printing to make a printed film.

In addition, metal aluminum was vapor-deposited, with a thickness of 500 Å, on one surface side of a 12 μm thick film of the same material as the biaxially oriented film used for the printed film, by a vacuum deposition process, to fabricate a vapor-deposited film.

A transparent adhesive of a polyester polyurethane resin was applied, with a thickness of 4 μm, to the printing ink surface side of the printed film by a gravure coater, then, the printed film was laminated on the resin surface side of the vapor-deposited film, and heat treatment was performed at 60° C. for 3 days to make a laminate film.

A polyester resin-based adhesive with specifications shown in Table 1 was provided, with a thickness of 5 μm, on the vapor-deposited layer side of the fabricated laminate film by a gravure coater to fabricate a specular gloss label.

The type of the main agent resin of the adhesive, the type and mixing amount of the curing agent, and the type and content of the inorganic pigment in the adhesive are shown in Table 1. The curing agent mixing amount and the inorganic pigment content are represented by parts by weight with respect to 100 parts of the polyester resin that is the main agent. In Table 1, an "internally blocked isocyanate curing agent" is indicated as "internal BI."

[Fabrication of Specular Gloss Seamless Can]

The specular gloss label made in the above was cut into a size in which the width is equal to the height of the can barrel, and the length is a length having a 5 mm overlap portion in addition to the perimeter of the can barrel. The cut specular gloss label was wound around the outer surface of the above seamless cup heated to 160° C., with pressurization, to adhere the overlap portion. Then, a polyester amino-based finishing varnish was further applied to the outer surface, with a thickness of 3 μm, and baking was performed at 200° C. for 1 minute in an oven. The opening side of the fabricated cup was subjected to necking processing, and then subjected to flange processing to fabricate a specular gloss seamless can. The specular gloss seamless can was stored at room temperature for 24 hours or more after the baking treatment, and then, the following evaluations were performed.

[Evaluation Process]

(i) Specular Glossiness Evaluation (Before Retorting)

For the fabricated specular gloss seamless can, the visual evaluation of specular glossiness was performed visually from the outer surface of the can, and was made in four grades. The evaluation criteria are very good (⊙), good (○), almost good (Δ), and poor (x). ⊙, ○, and Δ are within the acceptable range.

(ii) Specular Glossiness Evaluation (After Retorting)

The fabricated specular gloss seamless can was subjected to steam retort treatment at 130° C. for 30 minutes. Then, the visual evaluation of specular glossiness was performed visually from the outer surface of the can, and was made in four grades. The evaluation criteria are very good (⊙), good (○), almost good (Δ), and poor (x). ⊙, ○, and Δ are within the acceptable range.

(iii) Label Adhesiveness (After Retorting)

In order to evaluate the adhesiveness of the specular gloss label to the can barrel in the fabricated specular gloss seamless can, the specular gloss seamless can was subjected to steam retort treatment at 130° C. for 30 minutes and dried. Then, six scratches are provided in each of the can height direction and the can circumference direction at intervals of 1 mm by a cutter to make a lattice of 25 pieces. CELLOTAPE (trade name, Nichiban Co., Ltd.) was adhered to it and peeled once, and then, the label adhesiveness was evaluated according to the following criteria. The evaluation criteria are no peeling (⊙), peeling: less than 10% (○), peeling: 10% or more and less than 50% (Δ), and peeling: 50% or more (x). ⊙, ○, and Δ are within the acceptable range.

(iv) Overall Evaluation

The worst evaluation of (i) to (iii) was determined as individual overall evaluation in Examples and Comparative Example.

Example 1

For an adhesive, 5 parts by weight of an internally blocked isocyanate curing agent having a uretdione group was added to 100 parts by weight of a polyester resin (VYLON 670, Mn=20,000, Tg=7° C., produced by Toyobo Co., Ltd.) that was the main agent. Similarly, 50 parts by weight of titanium oxide (R-580, produced by ISHIHARA SANGYO KAISHA, LTD.), 0.5 parts by weight of a silane coupling agent (KBM-403, produced by Shin-Etsu Chemical Co., Ltd.), and a solvent were added, and the mixture was stirred to obtain an adhesive. A specular gloss seamless can was fabricated. The finishing varnish was provided with a thickness of 3 μm. The internally blocked isocyanate curing agent was one that started reaction at 140° C. The results are shown in Table 1 (The same applies to the following Examples and Comparative Example).

Example 2

A specular gloss seamless can was fabricated as in Example 1, except that 20 parts by weight of the internally blocked isocyanate was added.

Example 3

A specular gloss seamless can was fabricated as in Example 1, except that the internally blocked isocyanate was 0.1 parts by weight.

Example 4

A specular gloss seamless can was fabricated as in Example 1, except that the finishing varnish layer was not provided.

Example 5

A specular gloss seamless can was fabricated as in Example 1, except that the titanium oxide in the adhesive was 100 parts by weight.

Example 6

A specular gloss seamless can was fabricated as in Example 1, except that the titanium oxide in the adhesive was 1 part by weight.

Example 7

A specular gloss seamless can was fabricated as in Example 1, except that no titanium oxide was added to the adhesive.

Example 8

A specular gloss seamless can was fabricated as in Example 1, except that an aluminum foil (SUPERFOIL, 7 μm, produced by Toyo Aluminium K.K.) was used instead of the vapor-deposited film. In Examples 4 and 8 to 10, the layer configuration is partially different from that of other Examples, as described in the margin of Table 1.

Example 9

A specular gloss seamless can was fabricated as in Example 1, except that the transparent adhesion layer of the printed film and the vapor-deposited surface side of the vapor-deposited film were laminated, and the adhesive was applied onto the resin surface of the vapor-deposited film to fabricate a specular gloss label.

Example 10

A specular gloss seamless can was fabricated as in Example 1, except that metal aluminum was vapor-deposited on the resin surface side (the side opposite to the printed surface) of the printed film, and the adhesive was applied onto the vapor-deposited surface to fabricate a specular gloss label.

Comparative Example 1

A specular gloss seamless can was fabricated as in Example 1, except that instead of the internally blocked isocyanate, 5 parts by weight of Block HDI (B-882N, produced by Mitsui Chemicals Polyurethanes, Inc.) was added as the curing agent of the adhesive. After baking in the oven, many blisters occurred, which are considered to be due to gas generation during the curing reaction of the adhesive, and the appearance worsened.

The conditions of the decorative portion and evaluation results in Examples and Comparative Example in the above are listed together in Table 1.

gloss is not obtained. The adhesiveness of each layer after the retort treatment also worsens, and the retort resistance is also not provided.

Accordingly, the rationality and significance of the requirements for the configurations in the present invention, and superiority to conventional art are clarified.

INDUSTRIAL APPLICABILITY

In the present invention, a metal foil or a vapor-deposited metal layer and a transparent resin film on which a pattern is printed are combined and laminated on the barrel portion of a can body, and sufficient specular gloss appears, and therefore, beautiful and brilliant specular gloss ornamentation can be achieved in a seamless cans or the like for the first time. In addition, the adhesion and bonding of the layers of the laminate on the barrel portion of the can body are strong even if the

TABLE 1

|  |  | Adhesive | | | | Evaluation | | | |
| --- | --- | --- | --- | --- | --- | --- | --- | --- | --- |
|  | Layer configuration | Main agent resin | Curing agent (parts by weight) | Inorganic pigment (parts by weight) | Finishing varnish | Specular gloss (before retorting) | Specular gloss (after retorting) | Label adhesiveness (after retorting) | Overall |
| Example 1 | A | Polyester-based | Internal BI (5) | TiO2 (50) | 3 μm | ⊙ | ⊙ | ⊙ | ⊙ |
| Example 2 | A | ↑ | Internal BI (20) | ↑ | ↑ | ⊙ | ⊙ | ○ | ○ |
| Example 3 | A | ↑ | Internal BI (0.1) | ↑ | ↑ | ⊙ | ⊙ | ○ | ○ |
| Example 4 | B | ↑ | Internal BI (5) | ↑ | No | ⊙ | Δ | ⊙ | Δ |
| Example 5 | A | ↑ | ↑ | TiO2 (100) | 3 μm | ⊙ | ⊙ | ○ | ○ |
| Example 6 | A | ↑ | ↑ | TiO2 (1) | ↑ | ○ | ○ | ⊙ | ○ |
| Example 7 | A | ↑ | ↑ | No | ↑ | Δ | Δ | ⊙ | Δ |
| Example 8 | C | ↑ | ↑ | TiO2 (50) | ↑ | ⊙ | ○ | ⊙ | ○ |
| Example 9 | D | ↑ | ↑ | ↑ | ↑ | ⊙ | ○ | ⊙ | ○ |
| Example 10 | E | ↑ | ↑ | ↑ | ↑ | ⊙ | ○ | ⊙ | ○ |
| Comparative Example 1 | A | ↑ | Block HDI (5) | ↑ | ↑ | X | X | Δ | X |

Layer configuration (described in order from the outer surface side)
Layer configuration A: finishing varnish/resin film/printed layer/transparent adhesion layer/resin film/vapor-deposited aluminum layer/adhesion layer of the present application/can barrel outer surface film/can barrel metal
Layer configuration B: resin film/printed layer/transparent adhesion layer/resin film/vapor-deposited aluminum layer/adhesion layer of the present application/can barrel outer surface film/can barrel metal
Layer configuration C: finishing varnish/resin film/printed layer/transparent adhesion layer/aluminum foil/adhesion layer of the present application/can barrel outer surface film/can barrel metal
Layer configuration D: finishing varnish/resin film/printed layer/transparent adhesion layer/vapor-deposited aluminum layer/resin film/adhesion layer of the present application/can barrel outer surface film/can barrel metal
Layer configuration E: finishing varnish/printed layer/resin film/vapor-deposited aluminum layer/adhesion layer of the present application/can barrel outer surface film/can barrel metal

[Consideration of Results of Examples and Comparative Example]

Examples in the above satisfy requirements for the configuration in claim 1 of the present application, and particularly, mainly use the internally blocked curing agent, and therefore, no gas is generated during the curing of the curing agent, and very excellent specular gloss is obtained. Also after the retort treatment, the specular gloss does not decrease, the retort resistance is also high, and the adhesiveness of each layer is also good.

In Example 4, the finishing varnish is not applied, and therefore, the evaluation of specular gloss after the retorting is Δ (almost good). In Example 7, no inorganic pigment is added to the adhesive, and therefore, the specular gloss before and after the retorting is Δ (almost good). In Examples 8, 9, and 10, the number of the resin film layers on the outer surface side of the metal layer (the metal foil or the vapor-deposited layer) is fewer than that of other Examples by one, and therefore, the evaluation of specular gloss after the retorting is ○ (good).

On the other hand, in Comparative Example, the internally blocked curing agent is not used, and therefore, a gas is generated during the curing of the adhesive, and specular can is subjected to retort treatment. Therefore, the application field of the decorative can body of the present invention is mainly the field of storage containers for food or drink, and the decorative can body of the present invention is particularly suitable for the storage of food or drink to be retort-treated, and can also be preferably used in the fields of medicines, cosmetics, aerosol products, and the like.

The invention claimed is:

1. A decorative can having excellent specular gloss, comprising:
   a can body;
   a metal foil or a vapor-deposited metal layer
   an adhesive layer bonding the can body and the metal foil or the vapor-deposited metal layer; and
   a printed film laminated on the metal layer,
   wherein the adhesive layer comprises a thermosetting resin adhesive that generates no gas in heat curing.

2. The decorative can having excellent specular gloss according to claim 1, wherein the adhesive comprises an inorganic pigment.

3. The decorative can having excellent specular gloss according to claim 1, further comprising a surface coating on an outer surface of the printed film.

4. The decorative can having excellent specular gloss according to claim 1, further comprising a resin film between the printed film and the metal foil or the vapor-deposited metal layer.

5. The decorative can having excellent specular gloss according to claim 1, further comprising a hologram pattern between the printed film and the vapor-deposited metal layer.

6. The decorative can having excellent specular gloss according to claim 1, wherein food or drink is packed, and the decorative can body is retort-treated.

7. The decorative can having excellent specular gloss according to claim 1, wherein the can is a resin-coated seamless can.

8. The decorative can having excellent specular gloss according to claim 1, wherein the thermosetting resin adhesive that generates no gas is a thermosetting resin adhesive using an internally blocked isocyanate curing agent.

9. The decorative can having excellent specular gloss according to claim 8, wherein the thermosetting resin adhesive that generates no gas is any one or a mixture of two or more of a polyurethane resin-based adhesive, a polyester polyurethane resin-based adhesive, or a polyester resin-based adhesive using an internally blocked isocyanate curing agent.

10. A process for producing a decorative can having excellent specular gloss according to claim 1, comprising:
providing a metal foil or a vapor-deposited metal layer on a can barrel surface via an adhesive layer and further laminating a printed film, wherein the can barrel surface is mirror-finished without causing blisters (fine protrusions) in a decorative surface, by using, for the adhesive layer, a thermosetting resin adhesive that generates no gas in heat curing.

11. The process for producing a decorative can body having excellent specular gloss according to claim 10, wherein the adhesive that generates no gas is any one or a mixture of two or more of a polyurethane resin-based adhesive, a polyester polyurethane resin-based adhesive, or a polyester resin-based adhesive using an internally blocked isocyanate curing agent.

12. The process for producing a decorative can body having excellent specular gloss according to claim 10, wherein a hologram pattern is provided between the printed film and the vapor-deposited metal layer.

* * * * *